United States Patent
Wallgren

(10) Patent No.: US 10,035,393 B2
(45) Date of Patent: Jul. 31, 2018

(54) STEERABLE WHEEL SUSPENSION

(71) Applicant: ZF Friedrichshafen AG, Friedrichshafen (DE)

(72) Inventor: Klaus Wallgren, Karlsfeld (DE)

(73) Assignee: ZF Friedrichshafen AG, Friedrichshafen (DE)

(*) Notice: Subject to any disclaimer, the term of this patent is extended or adjusted under 35 U.S.C. 154(b) by 78 days.

(21) Appl. No.: 14/898,789

(22) PCT Filed: May 19, 2014

(86) PCT No.: PCT/EP2014/060181
§ 371 (c)(1),
(2) Date: Dec. 16, 2015

(87) PCT Pub. No.: WO2014/202300
PCT Pub. Date: Dec. 24, 2014

(65) Prior Publication Data
US 2016/0339753 A1     Nov. 24, 2016

(30) Foreign Application Priority Data

Jun. 19, 2013 (DE) .................. 10 2013 211 535

(51) Int. Cl.
*B60G 3/20* (2006.01)
*B60G 3/22* (2006.01)
(Continued)

(52) U.S. Cl.
CPC ............... *B60G 3/20* (2013.01); *B60G 3/22* (2013.01); *B60G 3/28* (2013.01); *B60G 7/001* (2013.01);
(Continued)

(58) Field of Classification Search
CPC ... B60G 3/20; B60G 3/22; B60G 3/28; B60G 7/001; B60G 7/008; B60G 2200/184;
(Continued)

(56) References Cited

U.S. PATENT DOCUMENTS 4,815,762 A    3/1989  Jurr
4,828,279 A    5/1989  Matschinsky
(Continued)

FOREIGN PATENT DOCUMENTS

DE    37 14 034 C1    6/1988
DE    37 29 767 A1    3/1989
(Continued)

OTHER PUBLICATIONS

German Search Report Corresponding to 10 2013 211 535.0 dated Jul. 16, 2014.
(Continued)

*Primary Examiner* — Barry Gooden, Jr.
(74) *Attorney, Agent, or Firm* — Davis & Bujold PLLC; Michael J. Bujold

(57) ABSTRACT

A wheel suspension for a motor vehicle, including a wheel carrier (2) for holding a wheel (3), a wheel-guiding control arm (4) for articulating the wheel carrier (2) to a structure, and steering member (23) for steering the wheel (3). For steering the wheel (3), the wheel carrier (2) and the wheel-guiding control arm (4) are articulated to one another in such manner that the wheel carrier (2) can pivot relative to the wheel-guiding control arm (4) about a steering axis. The wheel carrier (2) is connected indirectly to the control arm (4) in a first connection zone (20) by an integral link (5).

17 Claims, 4 Drawing Sheets

(51) Int. Cl.
*B60G 7/00* (2006.01)
*B60G 3/28* (2006.01)
*B62D 7/14* (2006.01)

(52) U.S. Cl.
CPC ............... *B60G 7/008* (2013.01); *B62D 7/14* (2013.01); *B60G 2200/184* (2013.01); *B60G 2200/422* (2013.01); *B60G 2200/44* (2013.01); *B60G 2200/4622* (2013.01); *B60G 2202/114* (2013.01); *B60G 2204/148* (2013.01); *B60G 2204/422* (2013.01); *B60G 2204/4222* (2013.01); *B60G 2206/0114* (2013.01); *B60G 2206/12* (2013.01); *B60G 2206/122* (2013.01); *B60G 2206/15* (2013.01); *B60G 2206/50* (2013.01); *B60G 2206/7101* (2013.01)

(58) Field of Classification Search
CPC .......... B60G 2200/422; B60G 2200/44; B60G 2200/4622; B60G 3/202; B60G 2200/132; B60G 2200/141; B62D 7/14
See application file for complete search history.

(56) References Cited

U.S. PATENT DOCUMENTS

| | | | |
|---|---|---|---|
| 4,903,981 A | 2/1990 | Alesso et al. | |
| 5,292,149 A | 3/1994 | Luger | |
| 5,380,024 A | 1/1995 | Hayami | |
| 5,697,633 A * | 12/1997 | Lee | B60G 3/26 280/124.128 |
| 5,979,919 A | 11/1999 | Bruehl | |
| 6,945,547 B2 * | 9/2005 | Ackley | B60G 3/18 280/124.143 |
| 8,286,979 B2 | 10/2012 | Schote | |
| 2004/0046349 A1 * | 3/2004 | Ackley | B60G 3/18 280/124.135 |
| 2015/0191064 A1 * | 7/2015 | Gielisch | B60G 3/145 280/124.129 |

FOREIGN PATENT DOCUMENTS

| | | |
|---|---|---|
| DE | 38 75 336 T2 | 3/1993 |
| DE | 44 23 126 A1 | 6/1995 |
| DE | 694 12 909 T2 | 4/1999 |
| DE | 697 35 117 T2 | 7/2006 |
| DE | 10 2005 049 947 A1 | 5/2007 |
| DE | 10 2006 029 136 A1 | 1/2008 |
| DE | 10 2006 055 295 A1 | 5/2008 |
| DE | 10 2010 012 014 A1 | 9/2011 |
| EP | 0 278 095 A1 | 12/1987 |
| EP | 0 873 891 A2 | 3/1998 |
| EP | 2 620 301 A1 | 7/2013 |
| JP | H04-372408 A | 12/1992 |
| JP | H07-47824 A | 2/1995 |
| JP | 2000-025434 A | 1/2000 |
| WO | 92/00201 A1 | 1/1992 |
| WO | 2008/061618 A1 | 5/2008 |
| WO | 2013/075787 A1 | 5/2013 |

OTHER PUBLICATIONS

International Search Report Corresponding to PCT/EP2014/060181 dated Jul. 14, 2014.
Written Opinion Corresponding to PCT/EP2014/060181 dated Jul. 14, 2014.
International Preliminary Report on Patentability Corresponding to PCT/EP2014/060181 dated Oct. 5, 2015.
International Preliminary Report on Patentability Corresponding to PCT/EP2014/060181 dated Sep. 29, 2015.

* cited by examiner

STEERABLE WHEEL SUSPENSION

This application is a National Stage completion of PCT/EP2014/060181 filed May 19, 2014, which claims priority from German patent application serial no. 10 2013 211 535.0 filed Jun. 19, 2013.

FIELD OF THE INVENTION

The present invention concerns a wheel suspension for a motor.

BACKGROUND OF THE INVENTION

From EP 0 278 095 A1 a wheel suspension for steerable wheels of motor vehicles is known, which comprises a wheel carrier on which the wheel is mounted. Of the wheel-guiding control arms, one can be displaced approximately in the transverse direction of the vehicle by means of an actuator motor and also carries the supporting spring. At its inner end, the control arm is articulated to an intermediate lever. The intermediate lever is mounted so that it can pivot about a pivot axis extending approximately in the longitudinal direction of the vehicle, and is connected at its lower end to the actuator motor via lateral track rods.

SUMMARY OF THE INVENTION

A purpose of the present invention is to design a wheel suspension in such manner that less structural fitting space is taken up by the wheel suspension.

The objective on which the invention is based is achieved by virtue of the characteristics and advantageous design features that emerge from the the drawings and description below.

A wheel suspension for a motor vehicle is proposed, in particular a rear wheel suspension, which comprises a wheel carrier for holding a wheel, a wheel-guiding control arm for connecting the wheel carrier in an articulated manner to a structure provided for the purpose, and steering means for steering the wheel. The wheel-guiding control arm can be articulated directly to the structure. Alternatively however, it can also be mounted on and articulated to an auxiliary frame, which in turn is connected to the structure. 'Steering means' is understood to mean any device suitable for turning the wheel through a defined steering angle, either passively in the manner of a track rod by means of the wheel stroke when the suspension is compressed or rebounds, or actively by means of an actuator motor. Relative to the longitudinal axis of the vehicle, in the steered condition the wheels are in a positively or negatively oblique position about a steering axis of the wheel that extends approximately in the vertical direction of the vehicle.

To design the wheel suspension so that it can be steered, the wheel carrier and the wheel-guiding control arm are articulated to one another in such manner that relative to the wheel-guiding, in particular track-guiding control arm, the wheel carrier can pivot about the steering axis. The steering axis is orientated essentially in the vertical direction of the vehicle. The wheel carrier is connected indirectly to the control arm, in particular in a first connection zone, by way of an integral link. In this way, advantageously a very compact steerable wheel suspension can be provided. The fitting space gained can thus be used to make the wheel suspension additionally drivable. For this, the wheel held and able to rotate on the wheel carrier can be coupled with a drive unit, in particular a wheel hub motor. Alternatively however, the wheel to be driven can also be connected to the drive aggregate indirectly, by way of a driveshaft. The drive aggregate can be an internal combustion engine or an electric motor. Due to the indirect coupling of the wheel carrier to the wheel-guiding control arm via the integral link, the wheel suspension can also be made very inexpensively.

It is advantageous for the wheel carrier also to be connected to the control arm directly at a second connection zone, in particular by means of a ball joint. Thus, in the second connection zone the wheel carrier is connected to the wheel-guiding control arm in such manner that it could pivot or rotate essentially freely without any additional control arm support. However, the integral link arranged a distance away therefrom in the first connection zone prevents the wheel carrier from rotating about the wheel axis. By virtue of the indirect articulation formed by the integral link in the first connection zone and the direct articulation formed by the ball joint in the second connection zone a distance away therefrom, the wheel carrier is articulated to the wheel-guiding control arm, in particular the toe-in guiding arm, in such manner that it can, on the one hand, be compressed and rebound in an articulated manner relative to the structure and/or auxiliary frame provided for that, and, on the other hand, be rotated about the steering axis so as to undergo a steering movement about the steering axis relative to the wheel-guiding control arm or relative to the structure.

To avoid rotation of the wheel carrier about the wheel axis, it is also advantageous for the two connection zones to be a distance apart from one another, in particular in the longitudinal direction of the vehicle. In that way the integral link arranged in the first connection zone acts as a supporting element, so that rotation of the wheel carrier about the wheel axis is prevented.

Furthermore, it is advantageous for one of the two connection zones, in particular the first connection zone, to be located behind the center of the wheel and the other ahead of the center of the wheel. In that way a sufficiently large distance between the first and second connection zones can be realized, so that the support forces acting on the integral link can be reduced.

The wheel suspension can be made very compact if in the undeflected condition of the wheel the integral link is orientated essentially in the vertical direction of the vehicle or at least approximately parallel thereto. Furthermore, in this way the maximum positive or negative steering angle can be made approximately the same size.

In an advantageous further development of the invention the integral link, in particular in the area of one of its two ends, is connected to the wheel carrier and, in particular in the area of its other end, it is connected to the wheel-guiding control arm, in each case by means of a swivel joint. Preferably the rotational axes of the two swivel joints are parallel to one another and/or orientated essentially in the longitudinal direction of the vehicle. In this way the wheel suspension can be made in a very compact and space-saving manner. Furthermore, the steering means can be of simple design since to deflect the integral link they only have to be displaceable in the transverse direction of the vehicle. This reduces the manufacturing costs of the wheel suspension.

Advantageously, the wheel-guiding control arm is at least partially in the form of a transverse arm and/or a longitudinal arm. Thus, the wheel-guiding control arm preferably comprises a transverse control arm section that extends essentially in the transverse direction of the vehicle and/or is positioned in the longitudinal direction of the vehicle behind, at, or in front of the center of the wheel. When the transverse control arm section is arranged, as is preferable, behind the center of the wheel in the longitudinal direction of the vehicle, then particularly in the case of all-wheel drive vehicles sufficient free fitting space can be provided in the area of the center of the wheel for the accommodation of the drive means, in particular motors and/or transmissions. A transverse control arm section arranged in and/or close to the center of the wheel, in particular in the travel direction, has the advantage that negative influences caused by transverse wheel forces, such as transverse forces and torques on the connection of the longitudinal control arm to the vehicle body or the structure, can be avoided. By virtue of the transverse control arm section a sufficiently high camber rigidity can be ensured, particularly if it is positioned close to the wheel center. In addition or alternatively, the control arm has a longitudinal arm section that extends essentially in the longitudinal direction of the vehicle. Preferably, this extends in the longitudinal direction of the vehicle from the transverse arm section to ahead of the wheel center. The free end of the longitudinal control arm section—i.e. the end thereof which is designed to be articulated to the vehicle body—as viewed in the longitudinal direction of the vehicle is located ahead of the wheel center. By virtue of the longitudinal control arm section any braking and acceleration torques that occur can advantageously be supported.

A good distribution of forces can be ensured if the control arm is essentially L-shaped since in that way, particularly by virtue of the longitudinal arm section, longitudinal wheel forces can be well supported. Preferably, in this case the transverse arm section forms the short limb and the longitudinal arm section the long limb of the L-shape. Preferably, the L-shaped control arm is arranged relative to the wheel carrier in such manner that its longitudinal arm section extends from the transverse arm section, in particular from the end thereof, essentially in the travel direction.

Advantageously, the first connection zone is formed in the area of the end of the transverse control arm section on the wheel carrier side. In addition or alternatively, the second connection zone is formed in the area of the longitudinal arm section. In that way the position and orientation of the control arm axis can be influenced for a desired toe-in behavior. Furthermore in that way the wheel suspension can be designed in a particularly space-saving manner, since both the integral link and also the steering means can be positioned behind the wheel center. In that way, particularly with a driven wheel suspension variant, sufficient space can be provided for the drive components. In addition, particularly with a design form steered actively by means of a steering tie-rod, the actuator that displaces the steering rod, preferably a servomotor, can be fixed onto the auxiliary frame of structure without problems.

For guiding the wheel it is advantageous for the wheel suspension to comprise a transverse wheel-guiding control arm, preferably designed to absorb transverse forces.

Alternatively however, the wheel suspension can comprise a wheel-guiding transverse leaf spring with two-point mounting, articulated in the area of its ends with the respective associated wheel carrier. To deflect and tilt the wheel carrier and the wheels provided for it, in the area between its two ends the transverse leaf spring is mounted at points at a distance from the ends. Preferably, the transverse leaf spring can be articulated in this area directly to the structure or alternatively mounted in an auxiliary frame which can be fitted on the structure. Furthermore, in the area of its two ends the transverse leaf spring is connected to the respectively associated wheel carriers. For this, the transverse leaf spring can be coupled directly or, however, alternatively also indirectly to the wheel carriers. When the connection is indirect, the transverse leaf spring can for example be connected to a link which is in turn articulated to the wheel carrier concerned.

It is advantageous for the wheel-guiding control arm to be arranged in a lower control arm plane and the transverse leaf spring, or alternatively the transverse control link, to be in an upper control arm plane located above the lower plane. This allows the wheel suspension to be made very compact. Moreover, particularly in the case of the transverse leaf spring variant, in such an arrangement the transverse leaf spring can be protected very effectively against mechanical and thermal influences. For example, the exhaust gas unit customarily arranged in the area of the lower control arm plane has no influence on the transverse leaf spring a distance away from it. Consequently, the transverse leaf spring can even be made from temperature-sensitive materials, in particular fiber-reinforced plastics, by virtue of which the weight of the wheel suspension can be greatly reduced.

Furthermore, by positioning the transverse leaf spring higher up, the jounce stroke and/or rolling range can be greatly increased. Owing to the larger spring motion of the transverse leaf spring far better adjustment possibilities for the wheel suspension become available. In addition, by virtue of such a high-positioned transverse leaf spring the wheel suspension can be made in a very space-saving, simple and light manner. In particular, thanks to this very space-saving design a driven axle can also be realized without problems.

It is advantageous for the transverse leaf spring to be made wheel-guiding. Thus, the transverse leaf spring can be connected to the wheel carrier concerned in such manner that by means of it, in particular forces occurring in the transverse and/or longitudinal direction of the vehicle can be absorbed or supported. Owing to its arrangement and high position the transverse leaf spring behaves essentially as an upper transverse control link or essentially assumes the functions thereof. Advantageously, it is therefore possible to do without additional control arms, so that the wheel suspension can be produced more simply and inexpensively.

In an advantageous further development of the invention the wheel suspension is a double transverse control arm wheel suspension, wherein preferably the upper transverse control arm is formed by the transverse leaf spring. In this way a very light suspension that is easy to produce and to assemble can be made.

To be able to do without additional control arms it is advantageous for the transverse leaf spring, in the area of its two ends, to be articulated and/or connected directly to the respective wheel carriers. Thereby, the transverse leaf spring is not only responsible for the springing of the wheel suspension but in addition, at least partially also for the wheel guiding. Consequently, the design complexity of the wheel suspension is greatly reduced. In that connection it is also advantageous for the articulated connection to be formed by a swivel joint whose rotation axis is preferably orientated essentially in the longitudinal direction of the vehicle. In that way wheel guiding by means of the transverse leaf spring, particularly in the vertical direction of the vehicle, can be realized.

For the guiding properties of the transverse leaf spring it is advantageous for the spring to be made particularly torsionally rigid, with transverse spring leaves which are rigid in the longitudinal direction of the vehicle but yielding in the vertical direction thereof. This makes possible by means of the transverse leaf spring both a springing action and also a guiding action of the two wheel carriers. Consequently, no additional components, in particular control arms, are needed for those purposes.

It is also advantageous for the transverse leaf spring to be connected, or able to be connected, directly to the vehicle structure or indirectly by means of the auxiliary frame, by means of a first and a second mounting. This allows both vertical springing and roll springing to be realized. Thus, by means of the transverse leaf spring it is advantageously possible to do without an additional stabilizer, whereby the costs and structural complexity of the wheel suspension can be reduced. To be able to ensure such vertical and roll springing, it is advantageous for the first and second mountings in particular each to have a rotational axis parallel to the longitudinal direction of the vehicle. Moreover, it is advantageous for the two mountings preferably to be in the form of elastomer mountings, in particular rubber mountings, and to be arranged a distance apart and/or symmetrically relative to the longitudinal axis of the vehicle.

It is advantageous for the transverse control arm or the transverse leaf spring and/or the transverse control arm section of the wheel-guiding control arm to be arranged behind the wheel center and/or essentially one above the other in the vertical direction of the vehicle. Thus, in this case as well the wheel suspension can be made in a very space-saving manner, so that a drive for the wheels can be integrated without problems in the form of a pre-configured drive unit.

To steer the wheel carrier about the steering axis, it is advantageous for the steering means to be designed for passive steering by virtue of the jouncing of the wheel, as a track link. In this way the wheel suspension can be made very inexpensively. Alternatively however, the steering means can be designed for active steering by means of a servomotor or actuator, as a track rod. In that case the track rod is one whose length can be varied. This can for example be varied in length (shortened or lengthened) by a control unit that detects and regulates the drive dynamics depending on the desired driving experience, or in a manner adapted to the driving situation, in order to produce a steering movement of the wheel carrier supported against the vehicle body.

The wheel suspension can be made very compact if the steering means are connected to the wheel carrier, in particular directly. Thus, by virtue of a direct engagement of the steering means on the wheel carrier, very precise steering of the wheel carrier and the wheel rotationally connected thereto about the steering axis can take place.

To be able to provide sufficient fitting volume for driving the wheels, it is advantageous for the steering means to be arranged behind the wheel center.

It is advantageous for the wheel suspension to have an assembly support, particularly one made in two parts, with a first holding support for mounting the transverse leaf spring or transverse cross-member, with a second holding support for the articulation of the wheel-guiding control arm, particularly in its transverse arm section, and/or with a third holding support for holding the steering means. Owing to the two-part structure of the assembly support the transverse leaf spring can be fitted very quickly and simply. Advantageously, the transverse leaf spring is clamped in the area of the first and second mountings between the two parts of the assembly support. Furthermore, the fitting of the wheel suspension can be facilitated by an assembly support of this kind, since the wheel suspension can be fitted very quickly and simply as a module onto the structure or the auxiliary frame of the motor vehicle.

Advantageously, the wheel carrier can be connected to a drive unit, in particular being designed to be driven by a wheel hub motor, an electric motor and/or an internal combustion engine and/or to be connected to such a drive unit. By virtue of the transverse leaf spring additional control arms can be saved, so that sufficient fitting space can be provided for such a driven solution. The fitting space can be increased still further by the arrangement of the steering means behind the wheel center and by also locating the integral link there. In addition, parts of the drive unit or even all of it can be attached to the assembly support. In that way the fitting effort of the wheel suspension designed as a module together with the drive unit can be substantially reduced.

BRIEF DESCRIPTION OF THE DRAWINGS

Below, the invention is explained in greater detail with reference to drawings, which show.

DETAILED DESCRIPTION OF THE PREFERRED EMBODIMENTS

FIGS. 1 to 3 and FIG. 4 show, in greatly simplified form, various perspective views of two alternative embodiments of a wheel suspension 1. The representations are limited to the essential components, in particular so that the connection zones of the components can be seen more clearly. Moreover, some of the figures show only a half-representation of an axle area, such that the wheel suspension of the wheel on the opposite side to that shown is identical in form.

Figure 1:
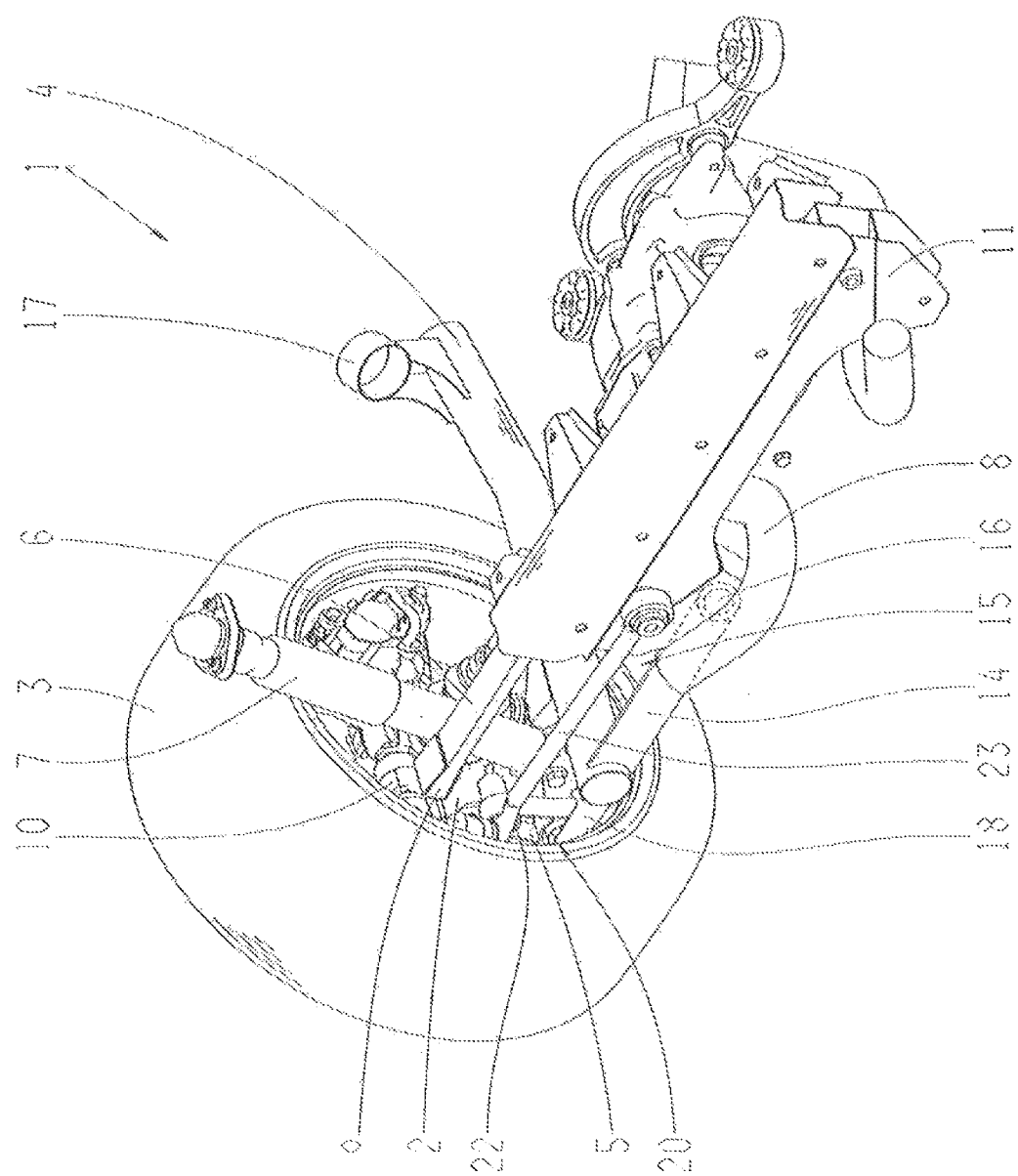
FIG. 1: A perspective view of a first example embodiment of a wheel suspension with a wheel-guiding control arm and a transverse leaf spring.
Figure 2:
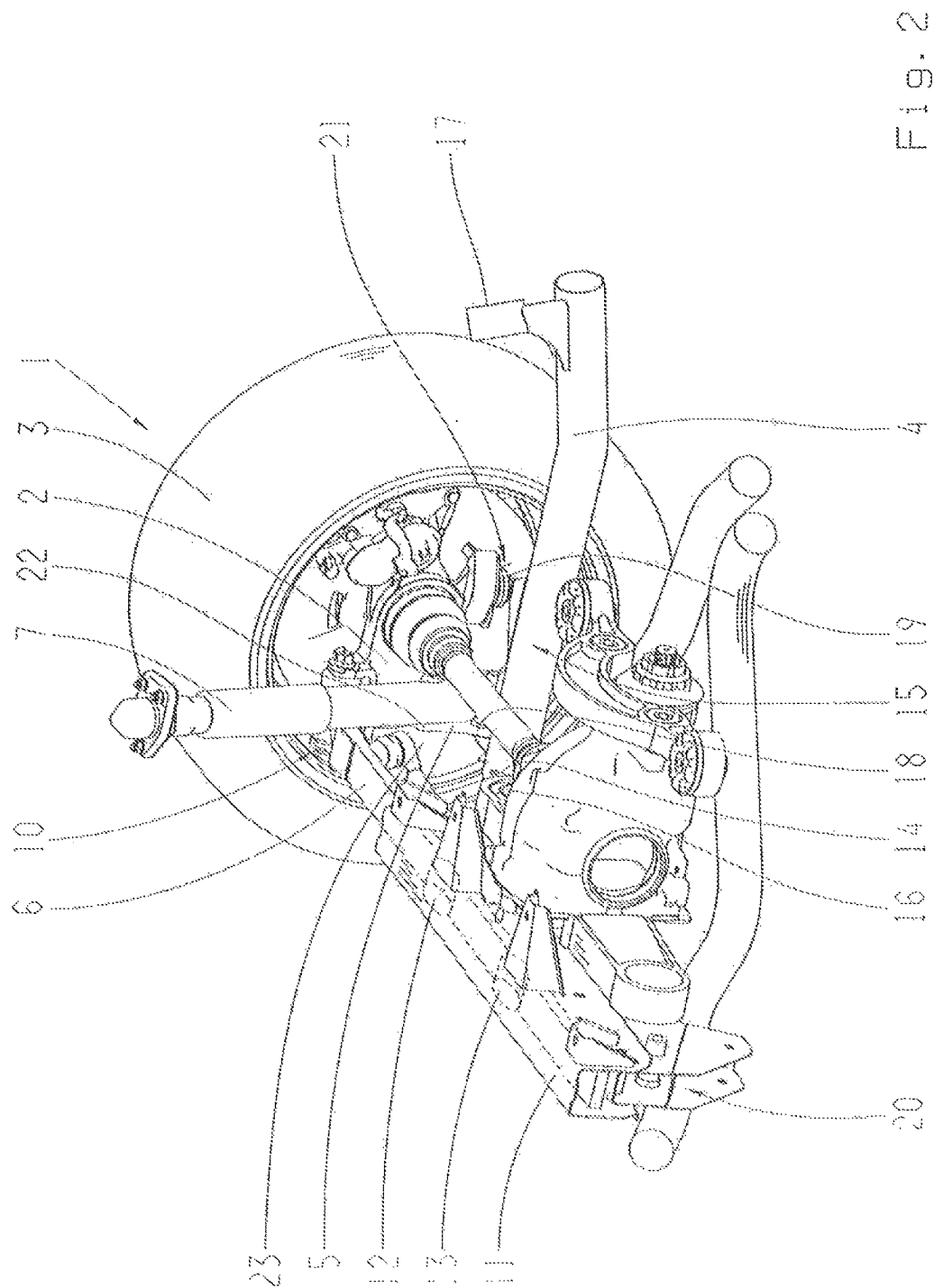
FIG. 2: A perspective view of the first example embodiment of a wheel-guiding control arm and a transverse leaf spring.
Figure 3:
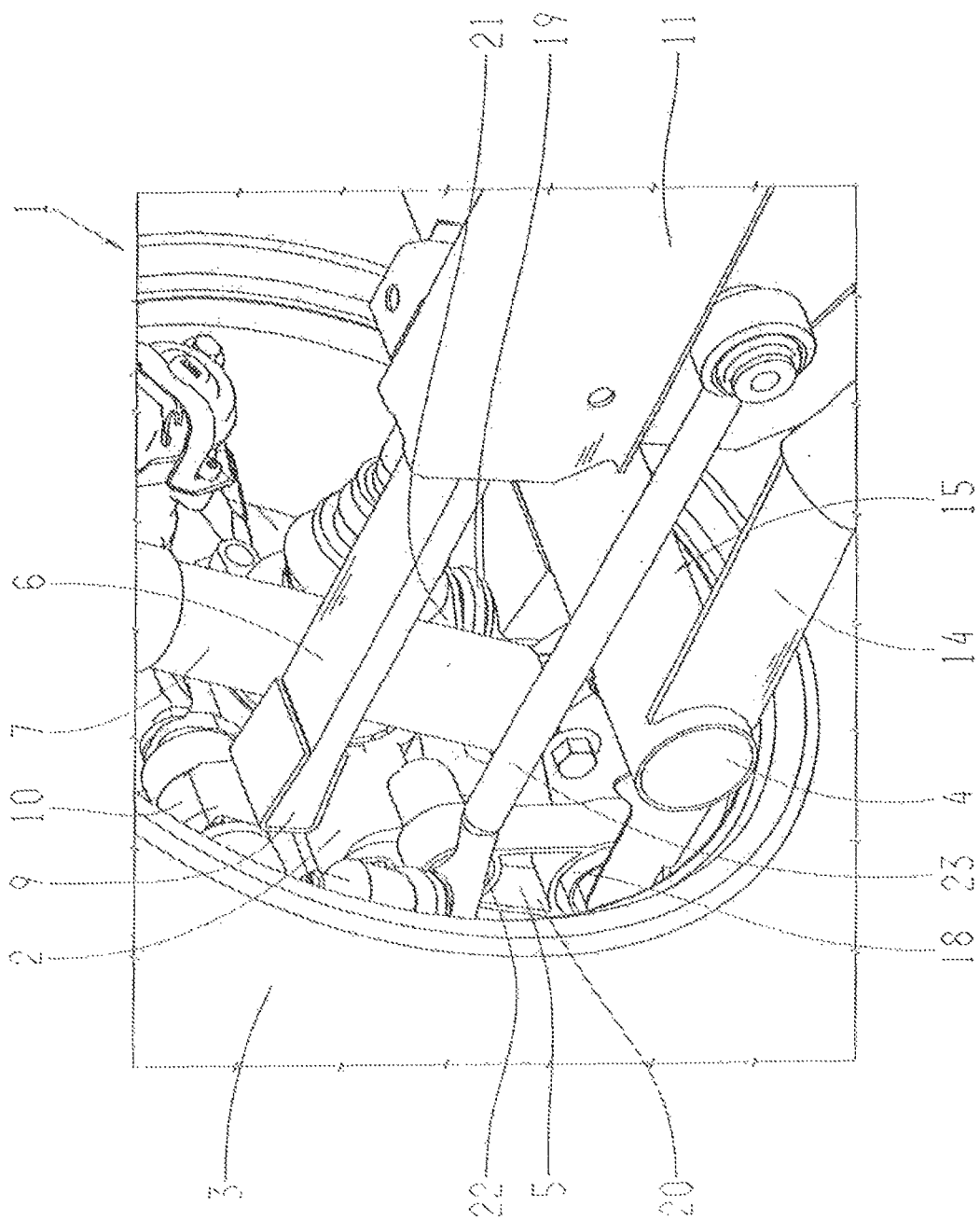
FIG. 3: A close up perspective view of the first example embodiment of a wheel-guiding control arm and a transverse leaf spring.

The first example embodiment of the wheel suspension 1 shown in FIGS. 1 to 3 has two wheel carriers 2 arranged opposite one another in the transverse direction of the vehicle, only one of these two wheel carriers 2 being shown. The wheel carrier 2 holds a wheel 3 mounted to rotate on it. Relative to a vehicle body (not shown here) the wheel 3 or wheel carrier 2 is articulated in such manner that relative to the body the suspension of the wheel 3 can be compressed and rebound, and can be actively or passively steered about a steering axis. For that purpose the wheel suspension 1 comprises a wheel-guiding control arm 4, an integral link 5 and a transverse leaf spring 6. Moreover, in this first example embodiment a damper 7 engages with the wheel-guiding control arm 4 in order to damp vibrations.

As can be seen particularly well in FIG. 1, the control arm 4 is arranged in a lower control-arm plane. The transverse leaf spring 6 is positioned in an upper control-arm plane, higher up. Thus, the transverse leaf spring 6 is a distance away from an exhaust gas unit 8 arranged in the area of the lower control-arm plane. Advantageously, the transverse leaf spring 6 can therefore be made of a temperature-sensitive material, in particular a fiber-reinforced plastic. This can substantially reduce the weight of the wheel suspension 1. Thus, the transverse leaf spring 6 preferably consists of carbon, glass and/or aramide fibers imbedded in a duroplastic and/or thermoplastic matrix. In this example embodiment the transverse leaf spring 6 is designed to be wheel-guiding. For that purpose the transverse leaf spring 6 is made torsionally rigid. Moreover, to absorb longitudinal forces the spring is made rigid in the longitudinal direction of the vehicle. To allow springing of the wheel suspension 1 the transverse leaf spring 6 is made yielding in the vertical direction of the vehicle. Thus, it combines the technical effect of a conventional spiral spring or leaf spring and a conventional upper transverse control arm in a single component.

The wheel guiding by the transverse leaf spring 6 takes place by virtue of an articulated joint between the transverse leaf spring 6 in the area of its end 9 and the wheel carrier 2 concerned, wherein the transverse leaf springs is supported on the vehicle body approximately centrally by the mountings 12, 13 (see FIG. 2). The articulated connection between the transverse leaf spring 6 and the wheel support 2 is formed in this example embodiment by a swivel joint 10. The rotational axis of the swivel joint 10 is orientated essentially in the longitudinal direction of the vehicle. Consequently, the wheel-guiding transverse leaf spring 6 can absorb longitudinal and/or transverse forces.

In the area between its two ends 6—only one of these two ends 6 being visible in the half-representation—the transverse leaf spring 6 is connected a distance away from the ends to an assembly support 11 in the form of a two-point mounting. The two-point mounting of the leaf spring 6 includes the first mounting 12 and the second mounting 13, such that the respective ends can swivel about the springs to allow springing of the wheel carrier. Thus, when the springing of the two wheel carriers 2 is uniform, the transverse leaf spring 6 becomes approximately U-shaped. During this the transverse leaf spring 6 pushes the body of the vehicle via the two mountings 12, 13, back to its rest position. Thus, the transverse leaf spring 6 fulfills the function of vertical springing. In the case of driving round a curve, when the suspension of one of the two wheel carriers 2 or wheels 3 is more strongly compressed than the other, the transverse leaf spring 6 as viewed in the travel direction becomes approximately S-shaped. In this case too the transverse leaf spring 6 pushes the vehicle body via the two mountings 12, 13 back to its rest position. Thus, the transverse leaf spring 6 acts as roll springing and therefore fulfills the function of a stabilizer, which latter can consequently be omitted in the present wheel suspension 1. Accordingly, the wheel suspension 1 can be made very light.

Besides the transverse leaf spring 6, the control arm 4 also fulfills the function of wheel guiding. The control arm 4 is essentially a trapezoidal link with transverse and longitudinal link portions. Thus, the control arm 4 is essentially L-shaped. The L is formed by a transverse arm section 14 and a longitudinal arm section 15. Starting from the transverse arm section 14, the longitudinal arm section 15 extends essentially in the longitudinal direction of the vehicle. In contrast, the transverse arm section extends in the transverse direction of the vehicle. Starting from the transverse arm section 14, in particular from the end thereof, the longitudinal arm section 15 extends essentially in the travel direction. Viewed in the longitudinal direction of the vehicle, the transverse arm section 14 of the control arm 4 is located behind the wheel center. The same applies to the transverse leaf spring 6, so that the transverse leaf spring 6 and the transverse control arm section 14 are also preferably arranged one above the other in the vertical direction of the vehicle.

On the vehicle structure side the wheel-guiding control arm 4 is articulated to the body at a first and second joint 16, 17 and/or to an auxiliary frame. The first joint 16 on the body side is located in the area of the end of the transverse arm section 14 facing away from the longitudinal arm section. It couples the control arm 4 in the area of its transverse arm section 14 to the assembly support 11. In contrast, the second joint 17 on the body side is located on the control arm 4 in the area of the end of the longitudinal arm section 15 facing away from the transverse arm section 14. By means of the second joint 17 the control arm 4 is coupled to the structure (not shown here).

For the compression and rebound of the wheel 3, the control arm 4 is in addition coupled to the wheel carrier 2 at a first and second joint 18, 19 on the wheel side. Thus, the wheel carrier 2 with the control arm 4 has a first and a second connection zone 20, 21. To be able to ensure not only the compression and rebound of the wheel carrier 2 relative to the vehicle structure but also to be additionally able to steer the wheel carrier 2 and the wheel connected thereto, in the second connection zone 21 the wheel carrier 2 is coupled directly, and in the first connection zone 20 indirectly to the control arm 4. When the wheel 3 is steered, the wheel carrier 2 is pivoted about a steering axis relative to the control arm 4. The connection line between the swivel joint 10 and the second joint 19 on the wheel side is in this case the virtual steering axis of the wheel carrier 2.

The control arm 4 is coupled indirectly to the wheel carrier 2 in the first connection zone 20 by means of the integral link 5. In the undeflected condition of the wheel 3, this is orientated substantially vertically. At its lower end facing toward the control arm 4 the integral link 5 is articulated to the control arm 4 by means of the first joint 18 on the wheel side. Furthermore, at its upper end facing toward the wheel carrier 2 the integral link 5 is coupled to the wheel carrier 2 by a wheel-carrier joint 22. The wheel-carrier joint 22 and the first joint 18 on the wheel side are in each case in the form of swivel joints. The rotational axes of the two swivel points are parallel to one another and orientated essentially in the longitudinal direction of the vehicle. Thus, relative to the structure or assembly support 11 the integral link 5 can pivot about the joint 18 on the wheel side in the transverse direction of the vehicle. During this movement, in the area of the wheel-carrier joint 22 the wheel carrier 2 moves toward or away from the structure. In combination with the second connection zone 21, therefore, the wheel carrier 2 undergoes a steering movement about the steering axis of the wheel suspension 1.

For that purpose, in contrast to the first connection zone 20 located behind the wheel center the second connection zone 21 is formed a distance away therefrom and ahead of the wheel center. Furthermore, in the second connection zone 21 the wheel carrier 2 is connected directly to the control arm 4, in particular its longitudinal arm section 15, by means of the second joint 19 on the wheel side. In the present example embodiment the joint 19 on the wheel side is in the form of a ball joint. Thus, without the integral link 5 the wheel carrier 2 could rotate about the wheel axis. However, that torque is blocked by the integral link 5.

The indirect and direct coupling formed by means of the integral link 5 and the second, wheel-side joint 19 or ball joint in the first and second connection zones 20, 21 enable a pivoting movement of the wheel carrier 2 relative to the wheel-guiding control arm 4 during the compression and rebound of the wheel 3. Furthermore, by virtue of this, coupling the wheel 3 is designed to be steerable. Accordingly, by the pivoting of the integral link 5 about the first wheel-side joint 18 relative to the wheel-guiding control arm 4, the wheel carrier 2 can rotate or pivot about the steering axis of the wheel suspension 1 orientated essentially in the vertical direction of the vehicle. To control this steering movement, the wheel suspension 1 comprises steering means 23, which in the present example embodiment are articulated to the wheel carrier 2. Alternatively however, in an example embodiment not illustrated here the steering means 23 could also engage directly with the integral link 5, in particular a distance away from its lower end.

In the present example embodiment the steering means 23 are in the form of a track link. This is articulated on the vehicle structure side to the assembly support 11 and on the wheel side to the wheel carrier 2, at a distance away from the wheel-guiding control arm 4 in the vertical direction of the vehicle. The first joint 18 located behind the wheel center is preferably flexible, in particular being in the form of a rubber mounting. In contrast the second wheel-side joint 19 ahead of the wheel center is preferably rigid. In that way it is in addition possible by using the elastic kinematics to maintain the desired toe-in over the wheel deflection. The adjustment of this self-steering behavior can be done by way of the steering means 23 or the track link 17. Alternatively however, in an example embodiment not shown here the steering means 23 could be in the form of a tie-rod which is deflected in the transverse direction of the vehicle by an actuator, in particular a servomotor, and therefore brings about a steering movement of the wheel carrier 2 relative to the control arm 4. In such a variant the actuator would preferably be mounted on the assembly support 11.

Figure 4:
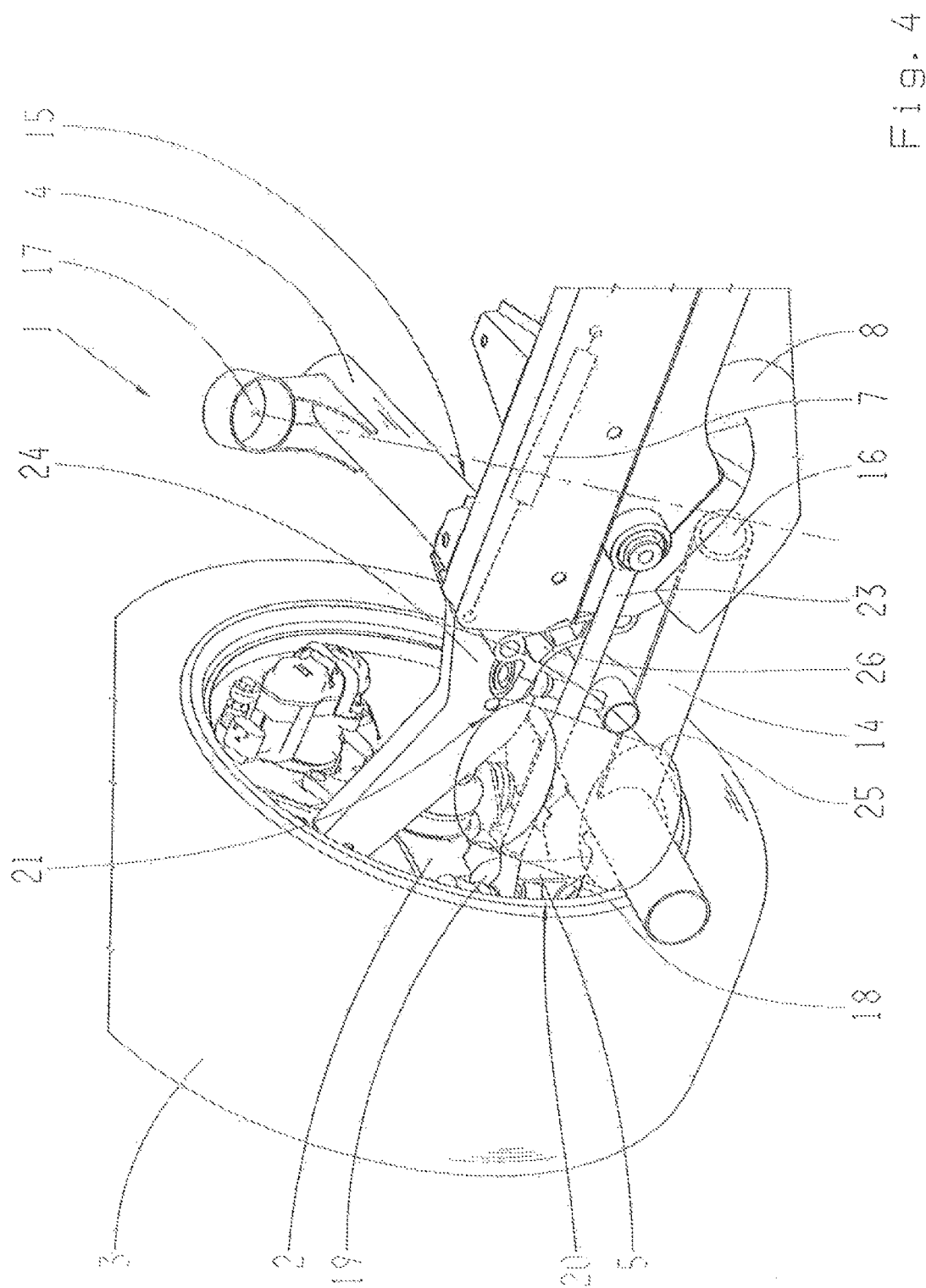
FIG. 4: A second example embodiment of a wheel suspension with a transverse control link in place of the transverse leaf spring.

FIG. 4 shows an alternative example embodiment of the wheel suspension 1. In the figure the same indexes are used for the same features as in the first example embodiment. Where these features are not described again in detail, their design and action correspond to those of the features already described above.

In contrast to the first example embodiment, the example embodiment shown in FIG. 4 has a transverse control link 24 arranged in the upper control-arm plane. This replaces the transverse leaf spring 6 of the first example embodiment. Furthermore, the wheel suspension 1 according to FIG. 4 comprises a spring 25 which engages on the wheel-guiding control arm 4, in particular in its transverse arm section 14. In addition the damper 7 is arranged in the assembly support 11 at a distance from the spring 25. The damper is coupled to the control arm 4 by way of a deflection device 26.

The present invention is not limited to the example embodiments illustrated and described. Variations within the scope of the claims are also possible, such as a combination of features even if these have been illustrated and described in relation to different example embodiments.

INDEXES

1 Wheel suspension
2 Wheel carrier
3 Wheel
4 Control arm
5 Integral link
6 Transverse leaf spring
7 Damper
8 Exhaust gas unit
9 End
10 Swivel joint
11 Assembly support
12 First mounting
13 Second mounting
14 Transverse arm section
15 Longitudinal arm section
16 First joint on the structure side
17 Second joint on the structure side
18 First joint on the wheel side
19 Second joint on the wheel side
20 First connection zone
21 Second connection zone
22 Wheel carrier joint
23 Steering means
24 Transverse control link
25 Spring
26 Deflection device

The invention claimed is:

1. A wheel suspension for a motor vehicle, the wheel suspension comprising:
a wheel carrier (2) for holding a wheel (3),
a wheel-guiding control arm (4) for articulating the wheel carrier (2) to a vehicle structure, and
steering means (23) for steering the wheel (3),
the wheel carrier (2) and the wheel-guiding control arm (4), for steering the wheel (3), being articulated to one another such that the wheel carrier (2) is pivotable relative to the wheel-guiding control arm (4) about a steering axis, and
the wheel carrier (2), in a first connection zone (20), being indirectly connected to the control arm (4) by way of an integral link (5), and an entirety of the integral link is located radially within the wheel, the wheel carrier being connected to the integral link such that the wheel carrier and the integral link pivot with respect to each other about a first rotational axis, and the control arm being connected to the integral link such that the control arm and the integral link pivot with respect to each other about a second rotational axis which is parallel to the first rotational axis.

2. The wheel suspension according to claim 1, wherein in an undeflected condition of the wheel (3), the integral link (5) is orientated substantially in a vertical direction of the vehicle.

3. The wheel suspension according to claim 1, wherein the integral link (5) is connected, via a first swivel joint, to the wheel carrier (2), and a second end of the integral link is connected, via a second swivel joint, to the control arm (4), the first and the second swivel joints defining the first and the second rotational axes, respectively, and both the first and the second rotational axes being substantially orientated in a longitudinal direction of the vehicle.

4. The wheel suspension according to claim 1, wherein the wheel suspension (1) comprises either a wheel-guiding transverse control link (24) or a wheel-guiding transverse leaf spring (6) with a two-point mounting (12, 13) and the wheel-guiding transverse control link (24) or the wheel-guiding transverse leaf spring (6) is connected, via a swivel joint, to the wheel carrier (2) such that the wheel-guiding transverse control link or the wheel-guiding transverse leaf spring and the wheel carrier are pivotable with respect to each other about a rotational axis that is orientated in a longitudinal direction of the vehicle.

5. The wheel suspension according to claim 1, wherein in a vertical direction of the vehicle, the wheel-guiding control arm (4) is arranged in a lower control arm plane and either of a transverse control link (24) or a transverse leaf spring (6) is arranged in a higher control arm plane, vertically above the lower control arm plane.

6. The wheel suspension according to claim 1, wherein either a transverse control link (24) or a transverse leaf spring (6) and a transverse arm section (14) of the wheel-guiding control arm (4) are at least one of arranged behind a center of the wheel, and substantially one above the other in a vertical direction of the vehicle.

7. The wheel suspension according to claim 1, wherein either the steering means (23) is a track link for passive steering by wheel deflection, or the steering means (23) is a track rod for active steering by means of an actuator.

8. The wheel suspension according to claim 1, wherein the steering means (23) is at least one of articulated directly to the wheel carrier (2) and arranged behind a center of the wheel.

9. The wheel suspension according to claim 1, wherein the control arm (4) has:
   a transverse arm section (14) that extends substantially in a transverse direction of the vehicle such that an end of the transverse arm section is located within the wheel and is located behind the center of the wheel, when viewed in a longitudinal direction of the vehicle; and
   a longitudinal arm section (15) that extends substantially in the longitudinal direction of the vehicle.

10. The wheel suspension according to claim 9, wherein the first connection zone (20) is located at an end of the transverse arm section (14) on a wheel carrier side; and a second connection zone (21) is located in an area of the longitudinal arm section (15).

11. The wheel suspension according to claim 1, wherein the wheel carrier (2), in a second connection zone (21), is directly connected to the control arm (4) by a ball joint.

12. The wheel suspension according to claim 11, wherein the first and the second connection zones (20; 21) are spaced away from one another in a longitudinal direction of the vehicle.

13. The wheel suspension according to claim 11, wherein one of the first and the second connection zones (20; 21) is located behind a center of the wheel and the other of the first and the second connection zones is located ahead of the center of the wheel and both the first and the second connection zones are located radially within the wheel.

14. The wheel suspension according to claim 11, wherein the first connection zone (20) is located behind a center of the wheel and the second connection zone is located ahead of the center of the wheel.

15. A wheel suspension for a motor vehicle which is drivable in a forward direction along a horizontal longitudinal axis, the wheel suspension comprising:
   a wheel (3) being mounted to a wheel carrier (2) which is radially arranged within the wheel;
   a wheel-guiding control arm (4) for steering the wheel carrier (2) with respect to the longitudinal axis of a vehicle structure;
   a track link for steering the wheel (3);
   the wheel carrier (2) and the wheel-guiding control arm (4) for steering the wheel (3) being articulated to one another such that the wheel carrier (2) is pivotable relative to the wheel-guiding control arm (4) about a steering axis,
   the wheel carrier (2) being indirectly connected, at a first connection zone, to the control arm (4) via an integral link (5), an entirety of the integral link is located radially within the wheel, and the wheel carrier being directly connected, at a second connection zone, to the control arm by a ball joint;
   the wheel carrier being connected to the integral link to pivot about a first rotational axis with respect to the integral link, and the control arm being connected to the integral link to pivot about a second rotational axis with respect to the integral link, and the first and the second rotational axes being parallel to each other; and
   the first and the second connection zones being located on opposite longitudinal sides of a vertical line that passes through a center of the wheel.

16. A wheel suspension for a motor vehicle which is drivable in a forward direction along a horizontal longitudinal axis, the wheel suspension comprising:
   a wheel (3) being mounted to a wheel carrier (2) which is radially arranged within the wheel;
   a wheel-guiding control arm (4) for steering the wheel carrier (2) with respect to the longitudinal axis of a vehicle structure;
   a track link for steering the wheel (3);
   the wheel carrier (2) and the wheel-guiding control arm (4) for steering the wheel (3) being articulated to one another such that the wheel carrier (2) is pivotable relative to the wheel-guiding control arm (4) about a steering axis,
   the wheel carrier (2) being indirectly connected, at a first connection zone, to the control arm (4) via an integral link (5), an entirety of the integral link is located radially within the wheel, and the wheel carrier being directly connected, at a second connection zone, to the control arm by a ball joint;
   the first and the second connection zones being located on opposite longitudinal sides of a vertical line that passes through a center of the wheel; and
   a first end of the integral link (5) is connected, via a first swivel joint, to the wheel carrier (2), and a second end of the integral link is connected, via a second swivel joint, to the control arm (4), and each the first and the second swivel joints defines a rotational axis, and either a transverse leaf spring or a transverse control arm is connected to the wheel carrier by a third swivel joint, which defines another rotational axis, such that the transverse leaf spring or the transverse control arm and the wheel carrier are pivotable with respect to each other, and
   when the vehicle is driving in the forward direction along the horizontal longitudinal axis with the wheel in an undeflected condition, the rotational axes of the first and the second swivel joints are at least one of parallel to one another and parallel to the longitudinal axis and the rotational axis of the third swivel joint extends parallel to the longitudinal axis.

17. The wheel suspension according to claim 16, wherein the first connection zone and the first and the second swivel joints are located on a longitudinally trailing side of the vertical line that passes through the center of the wheel, and the ball joint and the second connection zone are located on a longitudinally leading side of the vertical line that passes through the center of the wheel, and a connection line extending between the third swivel joint and the ball joint steering axis defining a steering axis of the wheel carrier.

* * * * *